United States Patent [19]

Bendig et al.

[11] 4,144,857

[45] Mar. 20, 1979

[54] DEVICE FOR AUTOMATICALLY CONTROLLING THE INTAKE AIR TEMPERATURE OF A CARBURETOR-EQUIPPED INTERNAL COMBUSTION ENGINE

[75] Inventors: Lothar Bendig, Ludwigsburg; Arthur Klotz, Neckargröningen, both of Fed. Rep. of Germany

[73] Assignee: Filterwerk Mann & Hummel GmbH, Ludwigsburg, Fed. Rep. of Germany

[21] Appl. No.: 842,781

[22] Filed: Oct. 17, 1977

[30] Foreign Application Priority Data

Oct. 18, 1976 [DE] Fed. Rep. of Germany ....... 2646936

[51] Int. Cl.² ............................................. F02M 31/00
[52] U.S. Cl. ............................ 123/122 D; 123/122 H; 236/13
[58] Field of Search ................ 123/122 D, 122 H; 236/13; 261/145, 39 B

[56] References Cited
U.S. PATENT DOCUMENTS

| 3,450,119 | 6/1969 | Sendebach | 123/122 D |
| 3,563,007 | 2/1971 | Clarke | 123/122 D |
| 3,830,210 | 8/1974 | Muller | 123/122 D |

*Primary Examiner*—Ronald H. Lazarus
*Attorney, Agent, or Firm*—Joseph A. Geiger

[57] ABSTRACT

A device for adjusting the intake air temperature of carburetor-equipped internal combustion engines having an air intake system with a flapper valve in a duct junction admitting cold raw air and/or preheated raw air to the intake filter, depending on the raw air temperatures, the flapper valve position being controlled by a pneumatic membrane actuator receiving negative pressure from the intake manifold, via a vacuum line with a thermostat-controlled relief valve responsive to the temperature of the air mixture. In the drive connection between the membrane actuator and the flapper is arranged a wax thermostat which increases or decreases the effective length of the connection in response to the ambient air temperature, thereby adding the thermostat displacements to the actuator displacements.

9 Claims, 6 Drawing Figures

DEVICE FOR AUTOMATICALLY CONTROLLING THE INTAKE AIR TEMPERATURE OF A CARBURETOR-EQUIPPED INTERNAL COMBUSTION ENGINE

BACKGROUND OF THE INVENTION

1. Field of the Invention

The present invention relates to air intake systems for carburetor-equipped internal combustion engines, and, more particularly, to an air intake system featuring a device for automatically controlling the intake air temperature by means of a continuously adjustable flapper valve which mixes cold raw air with preheated raw air, for the establishment of an optimal raw air intake temperature, under changing operating conditions.

2. Description of the Prior Art

The efficiency of carburetion and combustion in a carburetor-equipped combustion engine is best, when the temperature of the combustion air which is drawn in by the engine, through its filter and carburetor, is within an optimal temperature range. While higher air intake temperatures result in a correspondingly reduced volumetric efficiency, lower intake air temperatures may lead to poor carburetion and even carburetor icing, especially under full load operation of the engine. Obviously, the intake of cold raw air will also inhibit a rapid warmup of the engine after a cold start. A rapid engine warmup, however, is not only important for the longevity of the engine, by minimizing operation in a poorly lubricated state, it is also important for ecological reasons, because the emission of exhaust polutants is higher than normal during warmup from a cold start.

While it is obviously impractical to cool a flow of raw intake air whose temperature is above the optimal range, there exists an easy and inexpensive way of preheating raw intake air whose temperature is below the optimal range. The numerous inventive contributions which have been addressed to this problem area in the past, therefore, feature all a so-called exhaust stove, where raw air, under the suction effect of the engine intake action, is pulled through a duct or channel system whose walls are heated by the hot exhaust gasses. Such a stove is preferably arranged in conjunction with the exhaust manifold of the internal combustion engine. A warm air duct leads from the exhaust stove to the raw air duct of the air intake snorkel, at a junction point upstream of the air intake filter. Using suitable valve means, the intake air temperature can be adjusted by appropriately proportioning the flow of heated raw air coming from the exhaust stove against the flow of cold raw air coming from the intake snorkel. A great number of different prior art air intake systems feature such an arrangement.

In most air intake systems of this type, the proportioning valve is a pivotable flapper valve which, in one extreme position, closes the warm air duct, while fully opening the cold air duct through the snorkel and, in the other extreme position, closes the cold air duct, while fully opening the warm air duct. The positioning drive means for this flapper valve is in most cases a pneumatic membrane actuator which receives negative air pressure through a vacuum line linking the actuator to the air intake manifold, downstream of the carburetor.

Yet, this comparatively simple arrangement presents some stubborn problems, if reliable operation of the engine over the entire load range from idle to full load is desired, and if the flapper valve is to mix the two raw air flows in such a way that the intake air temperature remains the same, even though the temperatures of both the cold and warm air flows fluctuate within a wide range.

One problem has its source in the fact that the negative pressure in the air intake manifold is highest, when the engine idles, i.e. when the carburetor throttle is almost closed, and that the negative pressure is lowest, when the engine operates under full load, with the carburetor throttle fully open. This means that, under full load operation, the pneumatic membrane actuator is virtually ineffective.

Other problems relate to the need for measuring the temperature of the intake air flow which enters the engine via the filter and carburetor, in order to reset the position of the flapper valve at the duct junction, when the intake air temperature is above or below the desired level. This is commonly being done by means of a thermostat-controlled relief valve in the vacuum line which responds to an air temperature increase by progressively opening a relief port to the clean air space of the filter, thereby reducing the negative pressure in the membrane actuator and resetting the flapper valve in the direction of closing the warm air duct, with the result that relatively less preheated air will be fed to the engine.

The major problem connected with this relatively simple control mechanism relates to the sensitivity with which the thermostat-controlled relief valve responds to temperature changes. If the response is highly sensitive, so that even a small change in the intake air temperature produces a resetting of the flapper valve position, then the risk is great that the interaction between the relief valve and the flapper valve will result in the development of the dreaded pulsing phenomenon, when both the relief valve and the flapper valve alternatingly open and close, without reaching a stable state.

A low sensitivity of the thermostat-controlled relief valve, on the other hand, means that a sizable change in the temperature of the intake air mixture is required, in order to move the flapper valve from one position to another. This, in turn, signifies that one must accept a correspondingly greater deviation of the intake air temperature from the optimal temperature, when the raw air temperature conditions call for the flapper valve to move close to an adjustment end position. This can be explained as follows:

Because the negative air pressure in the vacuum line is not affected by any changes in the ambient temperature from summer levels to winter levels, a given adjustment position of the thermostat in the relief valve, reflective of a certain intake air temperature, will always produce the same flapper valve position. Yet, to obtain the desired intake air temperature, the flapper position must obviously be a different one in winter than in summer. In wintertime, one will therefore have to accept a lower intake air temperature, in order for the thermostat-controlled relief valve to increase the vacuum in the membrane actuator, so as to move the flapper further away from the warm air duct opening. Conversely, one will have to accept a higher intake air temperature, before the relief valve completely opens the vacuum line, so that the membrane actuator moves the flapper into a closed position against the warm air duct.

It follows that the extent to which the intake air temperature is lower in winter and higher in summer is a direct function of the sensitivity of response of the thermostat-controlled relief valve, so that a compromise has to be struck between safety against pulsing of the control mechanism and deviations of the intake air temperature from the optimum value, at high and low ambient temperatures.

In a known prior art device of this type, disclosed in German Gebrauchsmuster (Utility Model) No. 75 16 176, an attempt has been made to counteract the above-mentioned problems by arranging a movable stop in such a way that it reaches into the path of the flapper valve, when the raw air temperature falls below a certain level, so that the flapper is prevented from closing the opening of the warm air duct. The thermostatic member and its movable stop are ineffective above this critical raw air temperature.

The purpose of this stop mechanism is primarily to improve the continuous full load operation of the internal combustion engine, when the ambient temperature is below a certain critical level, because the membrane actuator would otherwise tend to completely close the warm air duct, for lack of negative pressure in the vacuum line, due to the completely open throttle in the carburetor. Carburetor icing can occur under these conditions.

For only brief periods of full load operation, at temperatures which are above that critical level, but below the desirable intake air temperature, the device further uses a thermostat-controlled check valve in the vacuum line which holds the negative air pressure in the membrane actuator for at least a while, thereby preventing the complete closing of the warm air duct, at least at the beginning of full load operation.

An air intake system with a similar thermostat-controlled relief valve and thermostat-controlled check valve is disclosed in U.S. Pat. No. 3,830,210.

SUMMARY OF THE INVENTION

It is the primary objective of the present invention to provide a better solution to the aforementioned problems and shortcomings of the prior art, by suggesting an improved intake air temperature controlling device which eliminates aberrations from the optimal intake air temperature, under changing ambient temperatures, particularly when the internal combustion engine operates under partial load. Another objective is, of course, to achieve such an improvement with a minimum of additional cost and complexity.

The present invention proposes to attain these objectives by suggesting an intake air temperature controlling device of the type described further above which features a length-adjustable drive connection between the flapper valve at the raw air duct junction and the membrane actuator controlling its setting, the length adjustment being obtained by means of a wax thermostat, in response to the ambient temperature, i.e. the temperature of the raw air entering through the snorkel and cold air duct of the air intake system. A stationary stop limits the movement of the membrane actuator, under the influence of its return spring, in the direction of closing of the warm air duct. Only the additional adjustment action of the wax thermostat, by lengthening the drive connection in response to a high ambient temperature, causes the flapper valve to completely close off the warm air duct.

The use of a wax thermostat in connection with the adjustment drive of a flapper valve is not new, as reflected in the disclosure of German Pat. No. 15 26 662.

There, a wax thermostat takes the place of the membrane actuator as the principal and only drive source for the flapper, responding to the temperature of the raw air mixture which enters the air intake filter. An entirely different effect is achieved, when, as in the present invention, the wax thermostat is arranged to respond to the ambient temperature and its drive output is added to the drive output of the pneumatic membrane actuator.

This result is achieved by arranging the wax thermostat in such a manner that it forms a part of the drive assembly which connects the membrane actuator to the flapper valve. The wax thermostat thus executes the adjustment movements of the membrane actuator, its output end adding to, or subtracting from these movements the length changes of the thermostat itself. A thermostat return spring forces the flapper valve to follow the return movements of the thermostat without backlash.

In a preferred embodiment of the invention, the pneumatic membrane actuator and the wax thermostat are arranged to form a preassembled, preadjusted drive unit which can be produced and stocked as a single spare component, being readily exchangeable, when the drive unit is defective. The structural details of this preferred embodiment include an actuator housing containing the conventional rubber membrane, actuator disc, and actuator return spring. But, instead of having the usual push rod connected to the actuator disc, the latter takes the form of a cup member, having attached thereto a frame which extends axially through the actuator housing in the direction of the flapper valve. The bottom wall of the actuator housing has a suitable rectangular aperture for the movements of this frame, an abutment shoulder of the cup member engaging the bottom wall near its aperture, in the extended actuator end position. The frame is preferably rectangular in outline, having a transverse wall at its distal extremity, this shape giving the frame completely open front and rear sides, so that the incoming raw air can flow through it.

The wax thermostats sits inside the rectangular frame, in an axial orientation, being biased against the cup member by means of a thermostat return spring. Suitable drive pins or rods, extending from opposite ends of the thermostat assembly, produce a backlash-free drive connection between the membrane actuator and the flapper valve. The lower drive rod which is pivotably connected to the flapper preferably engages the thermostat body through the intermediate of a perforated thermostat sleeve, the latter being held in place by the thermostat return spring.

In order to facilitate the mounting of the thermostat assembly in the rectangular frame, the latter has a slot arranged in the transverse wall of its lower extremity, so that the thermostat return spring, sleeve, and thermostat housing can be inserted and removed with a sideways pivoting movement. Suitable noses at the mouth of the assembly slot prevent the spring from accidentally shifting in this direction.

BRIEF DESCRIPTION OF THE DRAWINGS

Further special features and advantages of the invention will become apparent from the description following below, when taken together with the accompanying drawing which illustrates, by way of example, a preferred embodiment of the invention, represented in the various figures as follows.

DESCRIPTION OF THE PREFERRED EMBODIMENT

Figure 1:
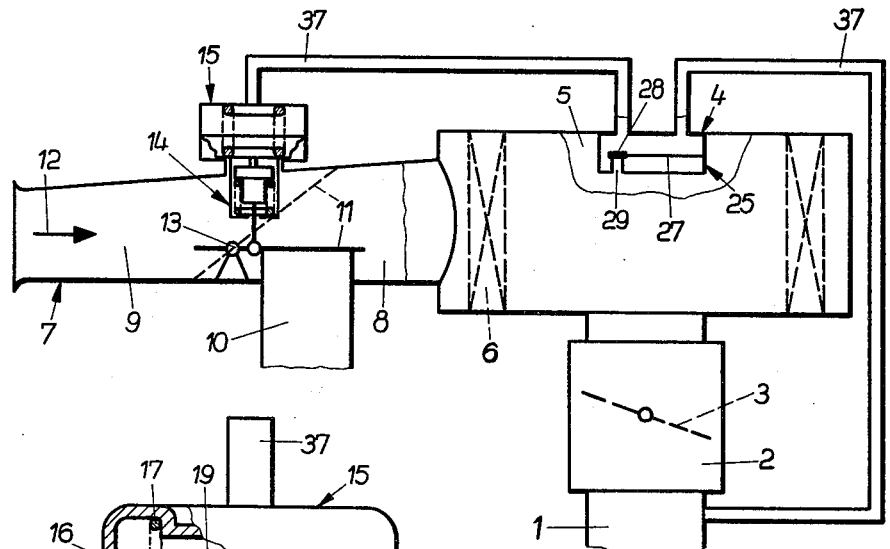
FIG. 1 shows, in a schematic representation, an arrangement of an air intake system for a carburetor-equipped internal combustion engine incorporating the temperature control device of the present invention.

In the following will be described a preferred embodiment of the invention, with particular reference to the accompanying drawing. FIG. 1 of this drawing shows, in a schematic elevational representation, an air intake system for a carburetor-equipped internal combustion engine, the engine itself being not shown. Such a system consists commonly of a carburetor 2, mounted on top of an air intake manifold 1 of the engine, an adjustable main throttle 3 controlling the amount of air which will be sucked into the engine, while fuel is being admixed thereto in the carburetor 2. On top of the carburetor 2 is mounted an air intake filter 4 of conventional design, having an annular filter element 6 inside which the filter defines a clean air space 5.

An air intake snorkel 7 admits raw air of ambient temperature into the cold air intake duct 9, past an intake duct junction with a warm air intake duct 10, from where the raw air flows through a short raw air mixing duct 8 into the housing of the intake filter 4. The warm air intake duct 10 supplies preheated raw air to the system, via an exhaust stove. The latter is a well-known engine component and therefore not shown in the drawing. The cold air intake duct 9 and the raw air mixing duct 8 are preferably part of a straight, near-horizontal duct structure into which the exit opening of the vertical warm air intake duct 10 extends a short distance from below, so as to form an exposed generally horizontal duct mouth, as part of the intake duct junction.

Inside the cold air intake duct 9, just upstream of the mouth of the warm air duct 10, is located the horizontal pivot axis 13 of a flapper 11 which is designed to pivot between a horizontal end position in which it closes off the warm air duct 10 and an inclined upper end position in which the warm air duct 10 is fully open, while the flow cross section of the cold air duct 9 is substantially obturated. The adjustment positions of the flapper 11 are determined by a pneumatic membrane actuator 15 which is mounted on top of the cold air intake duct, reaching downwardly into the duct through a rectangular aperture in its upper wall. The structural details of this membrane actuator and its interaction with the flapper valve will be described further below, in connection with FIG. 2.

A vacuum line 37 leads from a point downstream of the main throttle 3 to the membrane actuator 15, via a thermostat-controlled relief valve 25. This valve is preferably so mounted against the wall of the intake filter 4 that its bimetallic member 27 can measure the temperature of the incoming air in the clean air space 5, while its connections for the vacuum line 37 reach to the outside of the filter housing. A detailed disclosure of such a thermostatic relief valve is given in U.S. Pat. No. 3,830,210, for example. The bimetallic member 27 of the valve 25 is arranged in a cantilever attachment inside the valve housing 26, controlling on its free end a valve element 28 which progressively opens and closes a relief port 29 leading into the clean air space 5, as the bimetallic member 27 bends in response to air temperature changes. A tiny vent hole (not shown) in the wall of the valve housing 26, not large enough to sufficiently reduce the negative pressure inside the vacuum line 37, allows for a small air flow from the clean air space 5 into the valve housing 26, so that the temperature inside the latter corresponds to the temperature of the intake air.

Figure 2:
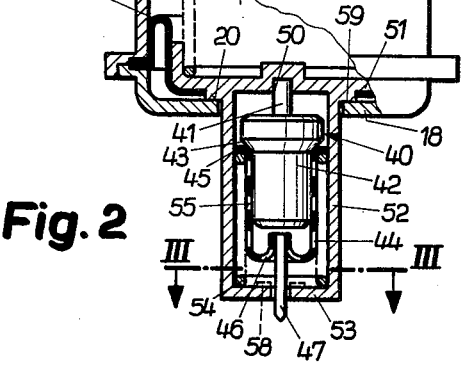
FIG. 2 shows, in a longitudinal cross section, a preassembled drive unit incorporating a pneumatic membrane actuator and a wax thermostat.

Referring now to FIG. 2, there is shown an assembled flapper drive unit which consists of the earlier-mentioned membrane actuator 15 and a wax thermostat 40 forming an integral part of the drive connection 14 (FIG. 1) between the actuator 15 and the flapper 11. The membrane actuator 15 features a rubber membrane 16 which forms a movable partition between a control pressure space 19 in the upper portion of the actuator housing and a downwardly open space in its bottom part. On the inner side of the rubber membrane 16 is seated a cup member 51 which follows the axial movements of the membrane 16 under changing negative pressures in the control pressure space 19. An actuator return spring 17 urges the cup member 51 downwardly, against the bottom wall 18 of the actuator housing, in opposition to the negative air pressure inside the space 19. The position of the membrane 16 and cup member 51, as shown in FIG. 2, reflects the pressure-less state of the membrane actuator, in which an annular shoulder 59 of the cup member 51 abuts against a stationary abutment face 20 of the bottom wall 18.

The wax thermostat 40 is represented in FIG. 1 by a thermostat housing 42 and a thermostat drive pin 41 extending upwardly therefrom into a matching recess 50 of the cup member 51. A barrel-shaped perforated metal sleeve 44 reaches over the lower portion of the thermostat housing 42, supporting it with a sleeve collar 45 which engages a tapered shoulder 43 of housing 42. To the bottom end of the thermostat sleeve 44 is fixedly attached an axially extending flapper drive rod 47 whose lower extremity if pivotably attached to the flapper 11, at a short distance downstream of its pivot axis 13.

Figure 3:
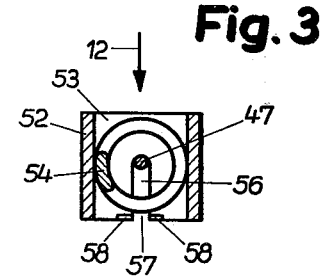
FIG. 3 shows a portion of the unit of FIG. 2, as seen in a cross section taken along lines III—III thereof.

Holding the wax thermostat in its position is a rectangular frame 52 which extends downwardly through an appropriate aperture of the actuator bottom wall 18, as an integral extension of the cup member 51. The frame 52 has at its lower extremity a transverse wall 53 with a slot 56 through which extends the flapper drive rod 47. The transverse wall 53 supports the lower end of a thermostat return spring 54 whose upper end bears against the collar 45 of the perforated thermostat sleeve 44. The thermostat return spring 54 is a conventional coil spring, centering the perforated sleeve 44 against its inner diameter and being itself held in place by the side walls of the frame 52 (FIG. 3).

A mounting slot 56 in the transverse wall 53 of the frame 52 makes it possible to insert the wax thermostat 40, together with its perforated sleeve 44 and return spring 54, without the need for opening the frame 52. For this purpose, the thermostat, perforated sleeve, and spring are first assembled by sliding one over the other, whereupon the assembly is simply inserted through the open side of frame 52, after the thermostat drive pin 41 has first been engaged into the recess 50. Once inserted, the lower extremity of the thermostat return spring 54 snaps into place, behind two retaining noses 58 near the mouth 57 of the mounting slot 56 (FIG. 3). The noses 58 serve to prevent the inserted thermostat assembly from accidentally shifting back out of the rectangular frame 52.

The complete flapper drive unit, as shown in FIG. 2, is mounted on the upper side of the cold air intake duct (FIG. 1) in such a way that the major portion of its rectangular frame 52 extends into the interior of duct 9, thereby exposing the wax thermostat 40 to the air flow inside the cold air intake duct 9. For this purpose, the drive unit is so oriented that the lateral openings of its rectangular frame 52 face in the direction of the air flow, as indicated by the arrow 12 (FIG. 3).

The operation of the novel flapper drive of the present invention will now be explained with reference to FIGS. 4-6, which show several characteristic settings of the flapper valve in a somewhat schematic representation. For the sake of clarity and simplicity, the flapper drive in these figures is shown without its thermostat return spring 54, perforated thermostat sleeve 44, and rectangular frame 52.

The operation of the internal combustion engine produces negative pressures of varying levels inside the air intake system, the negative pressure being highest in the air intake manifold 1 and lowest in the raw air intake ducts 9 and 10. The elevated negative pressure in the air intake manifold 1 is used as the drive medium for the membrane actuator 15, being supplied to its control pressure space 19 through the vacuum line 37.

The force with which the rubber membrane 16 and its cup member 51 are pulled upwardly, against the bias of the actuator return spring, is determined by the interior diameter of the membrane housing and by the difference in the negative pressures in the vacuum line 37 and in the cold air intake duct 9. However, the action of the thermostat-controlled relief valve 25, controlling the admittance of air into the vacuum line 37 through its relief port 29, may work to reduce the effective negative pressure in the vacuum line 37 anywhere from the highest level, which exists inside the air intake duct 1, to so low a level that the actuator return spring 17 moves the membrane actuator to its fully extended position, which is shown in FIG. 2.

The degree to which the negative air pressure inside the vacuum line 37 is reduced by the relief valve 25 depends on the temperature of the air flow inside the clean air space 5 of the air intake filter 4, which temperature is being measured by the bimetallic member 27. The higher the temperature of this clean air flow, the more the bimetallic element 27 will be bent upwardly and its valve element 28 lifted from the relief port 29. This means that a rise in the air temperature will have as a result a corresponding extension of the membrane actuator in the downward direction which, in turn, will produce an angular displacement of the flapper 11 in the direction of closing of the warm air intake duct 10. Accordingly, if the ambient temperature is sufficiently high, the membrane actuator 15 will remain extended downwardly, as shown in FIG. 4, and the warm air intake duct 10 will remain closed, regardless of the operating condition of the engine.

The negative air pressure inside the air intake manifold 1 is not constant, but depends on the angular position of the carburetor main throttle 3. The negative air pressure is highest, when the throttle opening is smallest, reflecting the idling mode of operation of the internal combustion engine. Assuming now that the ambient temperature is comparatively low, so that the thermostat-controlled relief valve 25 remains closed, then the membrane actuator 15 will be subjected to the maximum negative pressure so that its cup member 51 and attached frame 52 will be retracted upwardly, as far as possible. The simultaneous action of the cold intake air on the wax thermostat 4 will also shorten the effective length of the latter, so that the flapper 11 will be lifted to its upper end position, as shown by a dotted line in FIG. 1. In this flapper valve position, the cold air intake duct 9 is substantially closed off, while the warm air intake duct 10 is open for the supply of preheated raw air to the intake filter 4. This flapper valve position produces a rapid warmup of the engine, following a cold start.

As the temperature of the preheated air flowing through the warm air intake duct 10 increases in the course of warmup of the engine, its temperature will be sensed by the bimetallic member 27 of the relief valve 25 and the latter will respond by reducing the negative pressure in the vacuum line 37, thereby allowing the actuator return spring 17 to shift its drive assembly downwardly, in the direction of the flapper 11, so as to reset the latter closer to the warm air intake duct 10. The flapper 11 now admits intake air from the cold air intake duct 9 as well as from the warm air intake duct 10. An equilibrium adjustment will have been reached, when the angular position of the flapper 11 is such that the intake air temperature of the mixed intake air flow, received from the two raw air intake ducts 9 and 10, has a temperature at which the bimetallic member 27 of the relief valve 24 will not change its curvature.

If the internal combustion engine is subjected to an increasing load, as the main throttle 3 inside the carburetor 2 is progressively opened, a corresponding reduction of the negative air pressure inside the air intake manifold 1 takes place, until, under full load operation, with the main throttle 3 fully open, the negative air pressure inside the vacuum line 37 is so low that its effect on the membrane 16 will be overcome by the actuator return spring 17. If this full load operation takes place at an ambient temperature above a certain level, reflected by an extended wax thermostat 40, then the flapper 11 will be held in its low end position in which it closes off the warm air intake duct 10. This position is shown in FIG. 1 and in FIG. 4: Only raw air of ambient temperature, entering the intake system through the snorkel 7, is being supplied to the internal combustion engine. This setting assures an optimal volumetric efficiency of the engine, a condition which is especially important for full load operation.

A situation in which the ambient temperature lies below the level of optimal air intake temperature will produce a response from the wax thermostat 40 which is exposed to this temperature. The wax thermostat 40 will contract, shortening the effective length of the drive connection between the membrane actuator 15 and the flapper 11, and lifting the flapper 11 away from the mouth of the warm air intake duct 10, for the admittance of preheated raw air, even though the membrane actuator 15 may be fully extended. Such an operating position is shown in FIG. 5. It is characteristic for full load operation at low ambient temperatures. The addition of preheated raw air to the otherwise cold raw air entering through the cold air intake duct 9 will improve the operation of the carburetor and safely prevent the occurance of carburetor icing.

Figure 4:
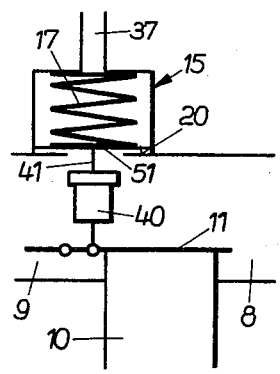
FIG. 4 shows schematically an operational position of the device of the invention reflecting full load operation at a comparatively high ambient temperature.
Figure 5:
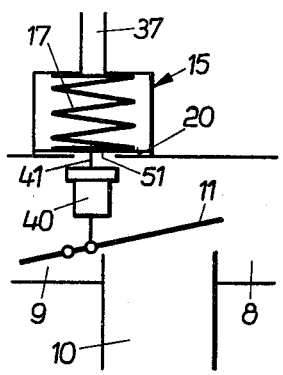
FIG. 5 shows an operational position of the device reflecting full load operation at a comparatively low ambient temperature.
Figure 6:
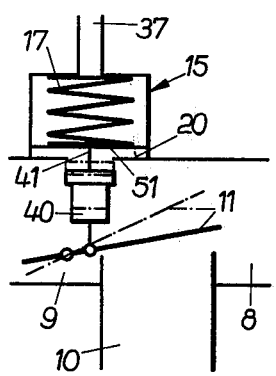
FIG. 6 shows an operational position of the device reflecting partial-load operation of the internal combustion engine.

While FIGS. 4 and 5 thus reflect full load operation of the engine in summer and winter, respectively, FIG. 6 shows a flapper setting which is characteristic of partial-load operation. The dimensions of the flapper drive assembly and the expension characteristics of the wax thermostat 4 are preferably so coordinated that changing ambient temperatures reflect themselves in a corresponding compensating extension or shortening of the drive connection between the membrane actuator 15 and the flapper 11. The thermostat return spring 54 thereby assures that the effective length of the drive connection is at all times reflective of the temperature of the intake air flowing through the cold air intake duct 9 and that this drive connection remains backlash-free. The response characteristic of the wax thermostat 4 is preferably such that, for a given membrane actuator position, as determined by the negative pressure in the vacuum line 37, it will respond to a change in the ambient temperature by resetting the flapper 11 to such an extent that the temperature of the mixed raw air flowing through the raw air mixing duct 8 and the clean air space 5 of filter 4 remains substantially unchanged. Accordingly, a low ambient temperature will reflect itself in a retracted flapper drive rod 47 and a raised flapper 11, as indicated by the stippled line in FIG. 6. Conversely, a higher ambient temperature will cause the wax thermostat 40 to extend and to push the flapper drive rod 47 downwardly, thereby pivoting the flapper 11 to a position such as indicated by the full line in FIG. 6, for example.

The novel device of the invention, while thus safely preventing carburetor icing, also assures that a very even intake air temperature is achieved at different ambient temperatures, when the engine operates at partial load. This means that the carburetor can be adjusted more precisely to this intake air flow temperature, for a cleaner and more efficient engine operation. The maintenance of an even air intake temperature also has the advantage of compensating for different cooling rates of the mixed raw air on its way between the flapper 11 and the thermostat-controlled relief valve 27, especially in systems where the raw air mixing duct 8 is comparatively long.

While the preferred embodiment of the invention features a straight drive connection between the pneumatic membrane actuator and the flapper valve, and the effective length of the drive connection is measured lineally between the stationary stop of the membrane actuator 15 and the pivot connection with the flapper 11, for example, it should be understood that this straight drive connection could be replaced by various other drive connections, including connections of the linkage type or of the rotary type, for example. In such a case, a change in the "effective length" of the drive connection, as produced by the wax thermostat, would have to be interpreted accordingly, viz. in the sense of adding or subtracting to the displacement action of the pneumatic valve actuator on the flapper valve. For example, if the pneumatic valve actuator is of the rotary type and connected directly to the pivot axis of the flapper, then the wax thermostat — or an appropriate bimetallic thermostat — would have to produce an angular drive adjustment between the actuator and the flapper. In each case, the displacement action of the thermostatic means is added to, or subtracted from, the basic displacement action of the pneumatic prime mover.

Accordingly, it should be understood that the foregoing disclosure describes only a preferred embodiment of the invention and that it is intended to cover all changes and modifications of this example of the invention which fall within the scope of the appended claims.

We claim the following:

1. A device for controlling the intake air temperature of an internal combustion engine which is equipped with a carburetor in its air intake system and an air filter upstream of the carburetor, and which has a raw air mixing duct leading into the air filter from an intake duct junction formed by a cold air intake duct through which is taken in raw air of ambient temperature and a warm air intake duct through which is taken in preheated raw air coming from an exhaust stove, for example, and valve means associated with said intake duct junction for adjusting the relative flows of raw air through said cold air intake duct and warm air intake duct by progressively opening one duct while at the same time closing the other duct, said air temperature controlling device comprising in combination:

a pneumatic valve actuator with an actuator return spring;

a drive connection between the valve means and said valve actuator;

a vacuum line leading from a point downstream of the carburetor to said actuator, the line being so connected thereto that the negative pressure supplied by said line moves the actuator against the actuator return spring, in the sense of opening the warm air intake duct and closing the cold air intake duct;

a thermostat-controlled relief valve arranged in the vacuum line, at a point where its thermostatically sensitive element responds to the temperature of the mixed intake air flow, said valve being so adjusted that an increase in temperature of the mixed air flow progressively increases the opening of a relief port in the vacuum line, thereby correspondingly reducing the negative pressure which is being supplied to the valve actuator, thus resetting the valve means in the direction of closing the warm air intake duct;

thermostatically responsive means in the drive connection between the valve means and the valve actuator for increasing and decreasing the effective length of said connection, when the temperature of the air flowing through the cold air intake duct increases or decreases, respectively, so that a rise in the ambient temperature results in a resetting of the valve means in the direction of closing the warm air intake duct; and abutment means arranged in said drive connection, in opposition to said actuator return spring and at a point of said connection which is located operatively between the actuator and the thermostatically responsive means, for stopping the actuator return movement in a position in which the effective length of the drive connection, as determined by a comparatively high ambient temperature level, causes the valve means to close the warm air intake duct, and in which the effective length of the drive connection, as determined by a comparatively low ambient temperature level, causes the valve means to partially open the warm air intake duct.

2. An intake air temperature controlling device as defined in claim 1, wherein
said abutment means includes a stationary stop which cooperates with a moving part of the pneumatic valve actuator, thereby determining that end position of the actuator which reflects the state in which the negative air pressure is weaker than the actuator return spring.

3. An intake air temperature controlling device as defined in claim 1, wherein
the pneumatic valve actuator is of the type having an axially displaceable flexible membrane and a rigid cup member attached to the membrane so as to follow its axial displacements; and
the drive connection has a proximate end member thereof attached to said cup member.

4. An intake air temperature controlling device as defined in claim 3, wherein
the drive connection executes a substantially straight-line movement in axial alignment with the valve actuator movement;
the attached end member of the drive connection is a frame which extends axially from the cup member of the actuator; and
the thermostatically responsive means in the drive connection is an axially expanding and contracting wax thermostat mounted in said frame, in axial alignment with the drive connection movement, in such a way that its expansion and contraction displacements produce correspondingly increased or decreased displacements of the drive connection at a distal end member thereof which is connected to the valve means.

5. An intake air temperature controlling device as defined in claim 4, wherein
the frame holding the wax thermostat is a rectangular frame with sidewalls attached to said cup member and extending in the axial direction, a transverse wall linking the sidewalls at their distal extremity;
the wax thermostat includes a thermostat drive pin extending axially towards the valve actuator, so as to engage its cup member, and a thermostat return spring, in the form of an axially oriented compression spring surrounding the wax thermostat and bearing against a shoulder of the thermostat with its proximate end, and against said transverse wall with its distal end, thereby biasing the thermostat towards the valve actuator; and
the wax thermostat further includes a valve drive rod which extends axially from its distal extremity and is operatively connected to the valve means, the oppositely extending thermostat drive pin and the valve drive rod executing relative axial displacements reflecting the temperature to which the wax thermostat is exposed.

6. An intake air temperature controlling device as defined in claim 5, wherein
the transverse wall of the rectangular frame has a mounting slot leading from an outside edge of the wall to the center thereof, for the lateral insertion into said frame of the wax thermostat and its valve drive rod, including said surrounding return spring;
said transverse wall further includes means for retaining the wax thermostat, drive rod and spring in the inserted position by retaining the distal extremity of the spring; and
the thermostat drive pin is retained and centered in relation to the cup member of the valve actuator by a central recess in the latter.

7. An intake air temperature controlling device as defined in claim 6, wherein
the wax thermostat has an axially oriented substantially cylindrical body, said shoulder being formed by a radially protruding collar near the actuator-proximate extremity thereof;
the thermostat body is surrounded by a perforated barrel-shaped thermostat sleeve, the proximate axial end of which is clamped to said shoulder; and
the valve drive rod is rigidly attached to the distal axial end of the thermostat sleeve.

8. An intake air temperature controlling device as defined in claim 7, wherein
the thermostat body is seated inside the thermostat sleeve, and the thermostat return spring guides the thermostat sleeve on the inner diameter of its coils; and
the thermostat sleeve has a flared proximate extremity with which it is clamped to the shoulder of the thermostat body, the proximate end of said return spring bearing against said flared sleeve extremity and, through the latter, against said shoulder, thereby providing the sleeve clamping action.

9. An intake air temperature controlling device as defined in claim 3, wherein
the cold air duct of the air intake system is a substantially straight channel of approximately rectangular cross-sectional outline;
the warm air duct is smaller in width than the cold air duct, extending through a sidewall of the latter to form said duct junction and terminating with an exposed warm air duct mouth inside said sidewall;
the valve means is a flapper valve having a pivot axis arranged upstream of the duct junction, in parallel alignment with a plane defined by the warm air duct mouth;
the pneumatic valve actuator is mounted on the outside of that sidewall of the cold air duct which is located opposite the sidewall which is associated with the duct junction; and
the drive connection between the valve actuator and the flapper valve extends inwardly from the duct side wall on which the actuator is mounted, to a pivot connection with the flapper valve, the thermostat of the drive connection being thus located inside the cold air duct and exposed to the air flow in it.

* * * * *